3,631,179
ZEARALANE PRODUCTION
Wilbert H. Urry, Chicago, Ill., assignor to Commercial
Solvents Corporation, New York, N.Y.
No Drawing. Filed Dec. 13, 1966, Ser. No. 601,339
Int. Cl. C70d 9/00
U.S. Cl. 260—343.2 F                    2 Claims

ABSTRACT OF THE DISCLOSURE

Disclosed is a preparation of zearalane from 10-undecanal.

The present invention relates to the preparation by a chemical synthesis process of a compound described and claimed in U.S. Letters Patent 3,239,341 issued Mar. 8, 1966 as having been produced from a product of fermentation therein described as the fermentation estrogenic substance (F.E.S.).

The conventional formula for this compound is:

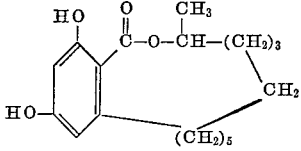

The chemical synthesis process of my invention is carried out in a series of steps described more particularly in the following specific examples.

EXAMPLE I

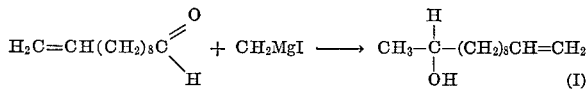

A solution of methyl magnesium iodide in anhydrous ether is prepared by the reaction of magnesium (7.76 g., 0.32 g. atom) with methyl iodide (45.0 g., 0.32 mole) in ether (45 ml.). Then 10-undecanal (42 g., 0.25 mole) in ether (50 ml.) is added to it. After this dropwise addition is complete, the reaction mixture is held at reflux for 16 hours. Hydrochloric acid (2.5 N) is added, the ether solution separated, and the aqueous portion is extracted twice with ether. The combined ether extracts are washed with water, 5% sodium bicarbonate solution, and again with water. The ether solution is dried over anhydrous magnesium sulfate. Its distillation gives 11-hydroxy-1-dodecene I (B.P. 77–78° at 0.3 mm., 44 g., 96%. $^1$H N.M.R. in CCl$_4$ with TMS: 3H doublet at 1.12δ, J 6.5 c.p.s.; 14H multiplet with broad singlet at 1.30δ; 2H multiplet at 2.00δ, J 6.5 c.p.s.; 1H multiplet at 3.62δ, J 6 c.p.s.; 1H singlet at 3.95δ, changes with concentration; and typical 3H vinyl multiplet 4.70–6.05δ).

Analysis.—C$_{12}$H$_{24}$O: Calculated (percent): C, 78.2; H, 13.1. Found (percent): C, 78.2; H, 13.0.

EXAMPLE II

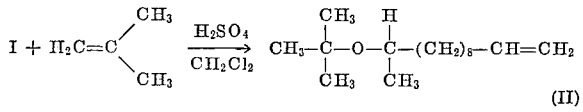

This 11-hydroxy-1-dodecene I (25 g., 0.135 mole) in solution in methylene chloride (700 ml.) containing concentrated sulfuric acid (2 ml.) is held at room temperature while 2-methylpropene is bubbled into it for 48 hours. Then the reaction mixture is allowed to stand for an additional 12 hours. It is then extracted twice with 5% sodium bicarbonate solution, and then with water. It is dried over anhydrous sodium sulfate. Distillation gives 11-t-butoxy-1-dodecene II (B.P. 71–73° at 0.3 mm., 22 g., 67%. $^1$H N.M.R. in CCl$_4$ with TMS: doublet at 1.05δ, J 6 c.p.s.; singlet at 1.13δ; 12H multiplet-big narrow peak at 1.32δ; 2H multiplet at 2.02δ; 1H multiplet at 3.50δ; and typical 3H vinyl multiplet, 4.70–6.10δ).

Analysis.—C$_{16}$H$_{32}$O: Calculated (percent): C, 79.9; H, 13.4. Found (percent): C, 79.8; H, 13.3.

EXAMPLE III

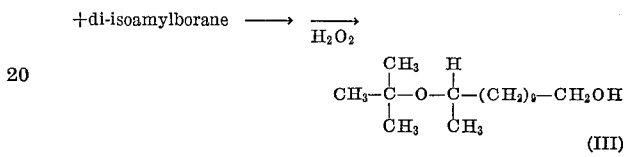

Di-isoamylborane (0.11 mole) is prepared by the reaction of sodium borohydride (3.2 g., 0.083 mole), boron trifluoride (15.5 g., 0.11 mole) and 2-methyl-2-butene (15.4 g., 0.22 mole) in diglyme (80 ml.). This reaction mixture was held at 0° for 24 hours. Then while it was vigorously stirred the 11-t-butoxy-1-dodecene II (22.0 g., 0.091 mole) is added to it, and the reaction mixture is stirred at 25° for 2.5 hours.

Then sodium hydroxide solution (3 N, 30 ml.) is added to it. This reaction mixture is stirred while cold hydrogen peroxide solution (30 ml., 30%) is added to it. The reaction temperature is held below 50°. Then the reaction mixture is extracted with ether, the ether extract is washed with water, and is dried (MgSO$_4$). Its distillation gives 11-t-butoxy-1-dodecanol III (B.P. 120–121° at 0.2 mm., 18.0 g., 73%. $^1$H N.M.R. in CCl$_4$ with TMS: 3H doublet at 1.07δ, J 6 c.p.s.; 9H singlet at 1.13δ; 12H broad singlet at 1.29δ; 3H multiplet with 2H triplet at 3.48δ, J 6 c.p.s., overlying 1H multiplet; and 1H singlet at 3.75δ, disappeared when D$_2$O was added).

Analysis.—C$_{16}$H$_{34}$O$_2$: Calculated (percent): C, 74.4; H, 13.3. Found (percent): C, 74.8; H, 13.1.

EXAMPLE IV

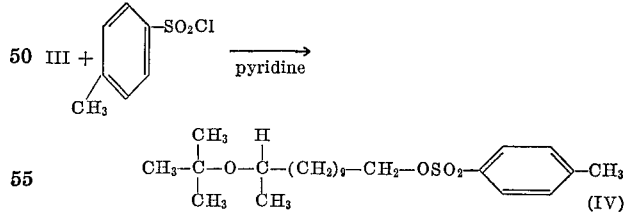

The 1-t-butoxy-1-dodecanol III (17.2 g., 0.067 mole) in pyridine (30 g.) is treated with p-toluenesulfonyl chloride (16.7 g., 0.088 mole). This reaction mixture is stirred at 20° for 5 hours. Then the pyridine is removed under reduced pressure, the residue is treated with water, and the mixture is extracted with ether. The ether solution is washed with water and is dried (MgSO$_4$). The ether is removed under vacuum to give the crude tosylate IV (25 g., 0.061 mole, 92%. ¹H N.M.R. in CCl₄ with TMS: 3H doublet at 0.97δ, J 7 c.p.s.; 9H singlet at 1.08δ; 18H multiplet, narrow, at 1.20δ; 3H singlet at 2.32δ; 1H multiplet at 3.35δ; 2H triplet at 3.90δ, c.p.s.; 2H doublet at 7.27δ, J9 c.p.s.; 2H doublet at 7.72δ, J9 c.p.s.) that did not crystallize.

EXAMPLE V

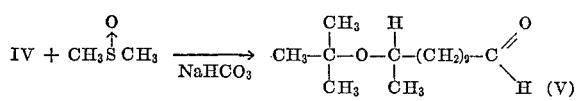

This tosylate IV (25.0 g., 0.061 mole is added to a solution of sodium bicarbonate (60 g.) in dimethylsulfoxide (250 ml.) at 150°. This reaction mixture is maintained at 150° with vigorous stirring for 4 minutes. After the reaction mixture has cooled, most of dimethylsulfoxide is removed at reduced pressure. The residue is treated with excess water, and the oily layer that separated is extracted with ether (2×75 ml.). The combined ether extracts are washed with water, and dried. Evaporation of the ether at reduced pressure gives crude 11-t-butoxydodecanal V (11.0 g., 0.043 mole, 70%. Tentative ¹H N.M.R. in CCl₄ with TMS: 3H doublet at 1.05δ, J 6.5 c.p.s.; 9H singlet at 1.13δ; 16H multiplet with narrow peak at 1.30δ; 2H triplet at 2.35δ, J 7.5 c.p.s.; 1H multiplet at 3.50δ; and 1H triplet at 9.77δ). This material is contaminated with ether (quartet at 3.40δ), and presumably 3-methyl-2-butanone (doublet at 1.07δ, J 6 c.p.s., and singlet at 2.03δ) from 3-methyl-2-butanol formed in the hydroboration-oxidation.

EXAMPLE VI

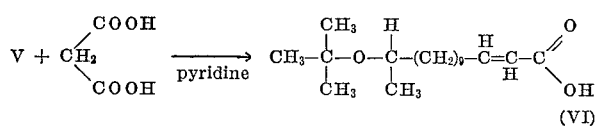

Malonic acid (8.0 g., 0.077 mole) is added to a solution of the 11-t-butoxydodecanal V (11.0 g., 0.043 mole) in pyridine (25 g.), and the reaction mixture is heated at 70° for 24 hours. (Higher yields are obtained if this reaction mixture is allowed to stand at 25° for 24 hours.) Then additional malonic acid (4.0 g., 0.038 mole) is added, and the reaction mixture is heated for an additional 36 hours. Then sulfuric acid solution (30 ml., 50%) is added to it, and the oil that separates is extracted with ether. The ether extract is washed with water and dried (MgSO₄). When the ether has been evaporated, the crude 13-t-butoxy-trans-2-tetradecenoic acid VI (8.0 g., 0.027 mole, 63% ¹H N.M.R. in CCl₄ with TMS: 3H doublet at 1.05δ, J 6 c.p.s.; 9H singlet at 1.13δ; 16H multiplet with narrow peak at 1.30δ; 2H multiplet at 2.22δ; 1H multiplet at 3.52δ; 1H doublet at 5.81δ, J 16.5 c.p.s.; 1H system of two triplets at 7.08δ with J 16.5 c.p.s. between them and 7.0 c.p.s. within them; 1H singlet at 9.67δ) is obtained. The overall yield in this sequence is 31%.

EXAMPLE VII

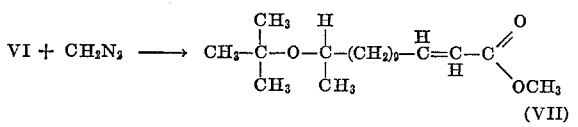

A solution of diazomethane in ether is added to a cold (0° C.) solution of 13-t-butoxy-trans-2-tetradecenoic acid VI (26.0 g., 0.087 mole) in the ether until its yellow color persisted. The ether is evaporated to give the crude ester (26.0 g.). This product is then distilled on the Nestor-Faust spinning band fractionating column to give pure methyl 13-t-butoxy-trans-2-tetradecenoate VII (14.0 g., B.P. 112° at 0.4 mm.).

*Analysis.*—C₁₉H₃₆O₃: Calculated (percent): C, 73.0; H, 11.6. Found (percent): C, 73.2; H, 11.6.

Its N.M.R. spectrum confirms this structure (¹H N.M.R. in CCl₄ with TMS: 3H doublet at 1.03δ, J 6 c.p.s.; 9H singlet at 1.13δ; 16H singlet at 1.30δ; 2H multiplet at 2.23δ, J 7 c.p.s.; 1H multiplet at 3.48δ; 3H singlet at 3.64δ; 1H set of two triplets at 5.73δ, J_trans 15.7 c.p.s. and J_methylene 1 c.p.s.; and 1H pair of triplets at 6.89δ, J_trans 15.7 c.p.s., J_methylene 7 c.p.s.).

EXAMPLE VIII

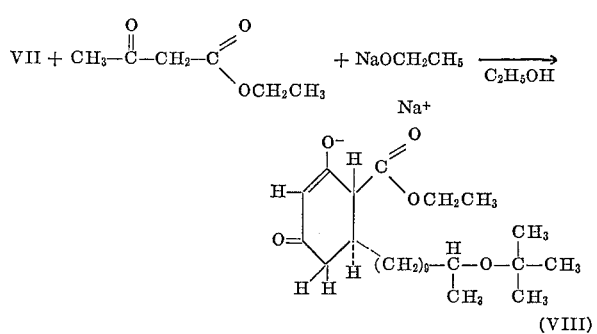

A reaction mixture containing methyl 13-t-butoxytrans-2-tetradecenoate VII (14.0 g., 0.045 mole), ethyl acetoacetate (5.85 g., 0.045 mole), and sodium ethoxide in absolute ethanol (prepared from 1.1 g., 0.048 gram atom, and ethanol, 25 ml.) is heated at reflux for 24 hours. After this reaction mixture has cooled, only part of the sodium salt product has precipitated. Approximately half of the ethanol is removed by evaporation (Rinco), and ethyl ether (25 ml.) is added to the residue. Filtration then gives the monosodium salt of ethyl 6-(10-t-butoxyundecyl)-dihydro-β-resorcylate VIII (13.0 g.).

EXAMPLE IX

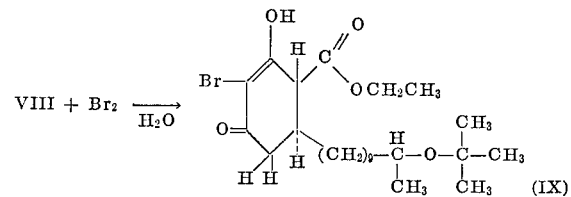

This sodium salt (13.0 g., 0.030 mole) in solution in water (100 ml.) is vigorously stirred while bromine (4.8 g., 0.030 mole) is added dropwise. The semi-solid product precipitates during the addition. It does not solidify completely after being kept at 0° for 12 hours. The reaction mixture is extracted with ether and combined ether extracts are washed with water and then dried (MgSO₄). Evaporation of the ether leaves a residual oily product (12.0 g.). This substance is not obtained in crystalline form but its N.M.R. spectrum is that expected for ethyl 3 - bromo - 6 - (10-t-butoxyundecyl)-dihydroresorcylate IX (¹H N.M.R. in CCl₄ with TMS: 34 H system from 0.90 to 1.80δ with up-field peak of methyl doublet visible at 1.00δ, singlet due to the t-butyl group at 1.15δ, and the large methylene singlet at 1.28δ; 4H multiplet 2.00–2.80δ; 1H multiplet at 3.32δ; 2H quartet at 4.20δ, J 7 c.p.s.; and 1H singlet at 7.60δ changes with concentration and disappears with treatment with D₂O).

EXAMPLE X

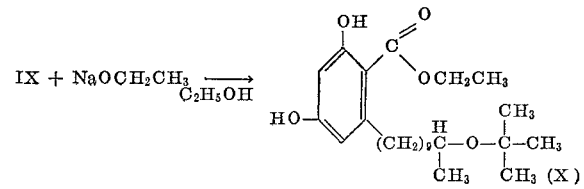

A reaction mixture containing this bromoester and sodium ethoxide solution (prepared from sodium, 6.0 g., 0.261 gram atom, with anhydrous ethanol, 150 ml.) is heated under reflux for 3 hours. After part of the ethanol (100 ml.) has been evaporated, the residual reaction mixture is acidified with concentrated sulfuric acid by a slow addition with efficient cooling. It then is immediately diluted with an excess of water. The oil that separates is extracted with ether. The ether solution is washed with water and is dried ($MgSO_4$). Evaporation of the resulting solution gives crude ethyl 6-(10-t-butoxyundecyl)-resorcylate X (9.0 g., 0.022 mole. $^1H$ N.M.R. in $CCl_4$ with TMS: doublet at 1.06δ, J 6.5 c.p.s.; singlet at 1.15δ; large singlet at 1.28δ; multiplet from 1.95–3.00δ; multiplet at 3.45δ; quartet at 4.35δ, J 7 c.p.s.; singlet at 6.18δ; and broad OH singlet at 8.45δ).

EXAMPLE XI

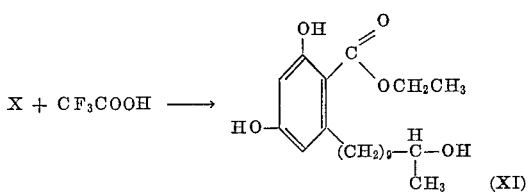

The crude resorcylate (9.0 g.) in trifluoroacetic acid (100 ml.) is held at 0° for 1 hour. Most of the acid is evaporated (Rinco), and the residual product is neutralized with a solution of sodium ethoxide in ethanol. The resulting mixture is acidified with sulfuric acid and then diluted with water. The oil product that separates is extracted with ether. The ether solution is washed with water and then is dried ($MgSO_4$). Removal of the ether gives crude ethyl 6-(10-hydroxyundecyl)-resorcylate XI (6.0 g.). In a second preparative sequence in which the same amount (13 g.) of the sodium salt is used, this product containing ethyl 6-(10-hydroxyundecyl) - resorcylate is treated with potassium carbonate solution. The oil suspended in the alkaline solution is extracted with ether and workup as usual gives more pure racemic ethyl 6-(10-hydroxyundecyl)-resorcylate XI (2.1 g.). The acidification of the sodium carbonate extract gives a material (2.0 g.) that is nonaromatic and contains no ethoxycarbonyl function (no quartet at 4.4δ and no singlet at 6.4δ).

The crude racemic ethyl 6-(10-hydroxyundecyl)-β-resorcylate XI (1.4 g.) is subjected to column chromatography (column, 2.5 cm. in diameter and 35 cm. long, with silica gel preheated for 12 hours at 115°). The sample is eluted with a mixed solvent (90% n-butyl ether, 10% acetic acid saturated with water), and 9 fractions (10 ml. each) are collected. When the mixed solvent is evaporated from fractions 5 to 9 and the residual material is triturated with ligroin (60–68°); crystalline product is obtained. Two recrystallizations from ether-ligroin (30–60°) gives pure racemic ethyl 6-(10-hydroxyundecyl)-β-resorcylate XI (M.P. 75–76°. $^1H$ N.M.R. in $CDCl_3$ with TMS: 23H multiplet 1.0–1.8δ with upfield peak of methyl doublet at 1.15δ and with its downfield peak under the main peak of the system at 1.18δ, and two downfield peaks of triplet at 1.39δ visible, J 7 c.p.s.; 2H triplet at 2.83δ, J 6 c.p.s.; 1H multiplet at 3.84δ; 2H quartet at 4.42δ, J 7 c.p.s.; broad 3H singlet at 4.90δ; 1H doublet at 6.20δ, J 2.5 c.p.s.; and 1H doublet at 6.28δ, J 2.5 c.p.s. Its mass spectrum, molecular ion 352 and base peak 196, is identical with the enantiomorph of ethyl 6-(10-hydroxy undecyl)-β-resorcylate, M.P. 60–61°, obtained from naturally-derived zearalane by reaction with sodium ethoxide in anhydrous ethanol).

*Analysis.*—$C_{20}H_{32}O_5$: Calculated (percent): C, 6.82; H, 9.2. Found (percent): C, 68.2; H, 9.2.

EXAMPLE XII

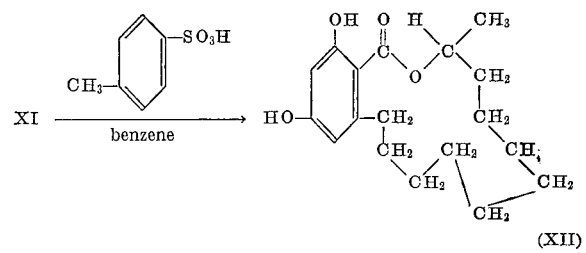

A solution of p-toluenesulfonic acid (2.0 g.) in benzene (700 ml.) is distilled until 30 ml. of distillate is obtained. Then ethyl 6-(10-hydroxyundecyl)-β-resorcylate XI (2.5 g.) is added to it, and the reaction mixture is held under reflux for 44 hours. Approximately half of the benzene is evaporated (Rinco), and the remaining solution is washed twice with water. It is dried ($Na_2SO_4$) overnight. Final evaporation of the benzene solution gives a dark oily product that is treated with decolorizing charcoal in ether solution. Evaporation of the ether gives a lighter oil, and attempts are made to recrystallize it from ethanol-water (50%).

This product studied by thin layer chromatography (Eastman Chromagram Silica Gel Sheet, K 301–R2 heated for 12 hours at 115°; with 90% butyl ether, and 10% acetic acid, saturated with water; and developed with iodine vapor) shows that it contains a small amount of 5-(10-hydroxyundecyl)-resorcinol ($R_f=0.28$), unreacted ethyl 6 - (10-hydroxyundecyl)-β-resorcylate ($R_f=0.43$), and racemic zearalane XII ($R_f=0.64$, the enantiomorphs of these three substances prepared from zearalenone had the same $R_f$ values).

In all of the above examples, the temperatures are in degrees, centigrade. In the N.M.R. data, TMS means tetramethylsilane.

The structural determination of the product of Example XII has been described in "Tetrahedron Letters," No. 37, pp. 3109–3114, 1966, Pergamon Press Ltd. in an article authored by W. H. Urry et al. In that article the product of Example XII is referred to as "Zearalane."

EXAMPLE XIII

Zearalane XII was also prepared from ethyl 6-(10-hydroxyundecyl)-β-resorcylate XI by the following procedure:

A solution of sodium ethoxide (prepared from sodium, 0.38 g., and absolute ethanol, 15 ml.) was added to Sulpholane (300 ml., purified by standing over molecular sieves (Linde 5A). The resulting solution was distilled (100-plate Nestor-Faust column) until 30 ml. of distillate had been removed from it. Then ethyl 6-(10-hydroxyundecyl) - β - resorcylate XI (0.704 g.) and molecular sieves (25 g., Linde 5A) were added to the remaining solution, and this reaction mixture was held at 130° for 72 hr. Periodic analyses during this reaction period with thin layer chromatography showed the gradual formation of racemic zearalane XII ($R_f=0.64$) as the ethyl 6-(10-hydroxyundecyl)-β-resorcylate was consumed, and after 72 hr. equilibrium had been established with 30% XI and 70% XII.

The reaction mixture then was treated with hydrogen bromide until it was acidic. It was extracted with ether (7× 100 ml.), and the combined ether extracts were washed with water and dried over anhydrous magnesium sulfate. The residual reaction product remaining after the ether had been evaporated was separated by column chromatogrphy (Eastman Chromatogram Silica Gel Sheet, K 301–R2 heated 12 hr. at 100° with mixed solvent containing 90% butyl ether and 10% acetic acid saturated with water). Of the eight chromatographic fractions (1 ml. each), the first three contained racemic zearalane XII.

The solvent was removed from them by evaporation, the residual product was dissolved in a minimum amount of chloroform, and the resulting chloroform solution was diluted with hexane. Pure crystalline racemic zearalane XII was obtained. Mass spectrum: molecular ion 306. $^1$H N.M.R. in perdeuteroacetone and $D_2O$ with TMS: 19H envelope 1.1–2.0δ with peaks of doublet at 1.32δ rising from it, J 6 c.p.s.; 2H multiplet at 2.43δ; 2H—DOH singlet at 4.31δ; 1H multiplet at 5.20δ; 1H doublet at 6.21δ; and 1H doublet at 6.29δ, J=2.5 c.p.s. Mass and N.M.R. spectra identical with those of zearalane obtained from zearalenone precipitated.

I claim:
1. A method for the chemical synthesis of racemic zearalane which comprises the steps of
   (a) reacting 10-undecenal with methyl magnesium iodide and acidifying the reaction mixture with a mineral acid to prepare 11-hydroxy-1-dodecene;
   (b) reacting 11-hydroxy-1-dodecene with 2-methylpropene in the presence of a mineral acid to prepare 11-t-butoxy-1-dodecene;
   (c) reacting 11-t-butoxy-1-dodecene with diisoamylborane and then hydrogen peroxide to prepare 11-t-butoxy-1-dodecanol;
   (d) reacting 11-t-butoxy-1-dodecanol with p-toluenesulfonyl chloride to prepare the tosylate of 11-t-butoxy-1-dodecanol;
   (e) reacting the tosylate of 11-t-butoxy-1-dodecanol with dimethylsulfoxide and sodium bicarbonate to prepare 11-t-butoxydodecanol;
   (f) reacting 11-t-butoxydodecanol with malonic acid and acidifying the reaction mixture with a mineral acid to prepare 13 - t-butoxy-trans-2-tetradecenoic acid;
   (g) reacting 13-t-butoxy-trans-2-tetradecenoic acid with diazomethane to prepare methyl 13-t-butoxy-trans-2-tetradecenoate;
   (h) reacting methyl 13-t-butoxy-trans-2-tetradecenoate with ethyl aceto-acetate and sodium ethoxide to prepare the monosodium salt of ethyl 6-(10-t-butoxyundecyl)-dihydro-β-resorcylate;
   (i) reacting the monosodium salt of ethyl 6-(10-t-butoxyundecyl)-dihydro-β-resorcylate with bromine to prepare ethyl 3-bromo-6-(10-t-butoxyundecyl)-dihydro-β-resorcylate;
   (j) reacting ethyl 3-bromo-6-(10-t-butoxyundecyl)-dihydro-β-resorcylate with sodium ethoxide and acidifying the reaction mixture with a mineral acid to prepare ethyl 6-(10-t-butoxyundecyl)-β-resorcylate;
   (k) treating ethyl 6-(10-t-butoxyundecyl)-β-resorcylate wtih trifluororacetic acid and neutralizing the resulting product with sodium ethoxide to prepare ethyl 6-(10-hydroxyundecyl)-β-resorcylate; and
   (l) reacting ethyl 6-(10-hydroxyundecyl)-β-resorcylate with p-toluenesulfonic acid to prepare zearalane.

2. A method for chemical synthesis of zearalane which comprises the steps of
   (a) reacting 10-undecenal with methyl magnesium iodide and acidifying the reaction mixture with a mineral acid to prepare 11-hydroxy-1-dodecene;
   (b) reacting 11-hydroxy-1-dodecene with 2-methylpropene in the presence of a mineral acid to prepare 11-t-butoxy-1-dodecene;
   (c) reacting 11-t-butoxy-1-dodecene with diisoamylborane and then hydrogen peroxide to prepare 11-t-butoxy-1-dodecanol;
   (d) reacting 11-t-butoxy-1-dodecanol with p-toluenesulfonyl chloride to prepare the tosylate of 11-t-butoxy-1-dodecanol;
   (e) reacting the tosylate of 11-t-butoxy-1-dodecanol with dimethylsulfoxide and sodium bicarbonate to prepare 11-t-butoxydodecanol;
   (f) reacting 11-t-butoxydodecanol with malonic acid and acidifying the reaction mixture with a mineral acid to prepare 13 - t-butoxy-trans-2-tetradecenoic acid;
   (g) reacting 13-t-butoxy-trans-2-tetradecenoic acid with diazomethane to prepare methyl 13-t-butoxy-trans-2-tetradecenoate;
   (h) reacting methyl 13-t-butoxy-trans-2-tetradecenoate with ethyl aceto-acetate and sodium ethoxide to prepare the monosodium salt of ethyl 6-(10-t-butoxyundecyl)-dihydro-β-resorcylate;
   (i) reacting the monosodium salt of ethyl 6-(10-t-butoxyundecyl)-dihydro-β-resorcylate with bromine to prepare ethyl 3-bromo-6-(10-t-butoxyundecyl)-dihydro-β-resorcylate;
   (j) reacting ethyl 3-bromo-6-(10-t-butoxyundecyl)-dihydro-β-resorcylate with sodium ethoxide and acidifying the reaction mixture with a mineral acid to prepare ethyl 6-(10-t-butoxyundecyl)-β-resorcylate;
   (k) treating ethyl 6-(10-t-butoxyundecyl)-β-resorcylate with trifluoroacetic acid and neutralizing the resulting product with sodium ethoxide to prepare ethyl 6-(10-hydroxyundecyl)-β-resorcylate; and
   (l) reacting ethyl-6-(10-hydroxyundecyl)-β-resorcylate with sodium ethoxide to prepare zearalane.

References Cited

Wagner et al., Synthetic Organic Chem., Wiley, New York (1953), p. 486.

Migrdichian, Organic Synthesis, Reinhold, New York (1957), vol. 1, pp. 328–9.

JAMES A. PATTEN, Primary Examiner

U.S. Cl. X.R.

260—405.5, 456 R, 468 R, 473, R, 602, 614 A, 614 R, 615 R, 619 R, 632 R, 638 R